T. L. JONES.

VALVE-GEARS FOR COMBINED HIGH-PRESSURE AND CONDENSING ENGINES.

No. 7,805. Reissued July 24, 1877.

WITNESSES.

Fred Leary

M. J. Smith

INVENTOR.

Thos. L. Jones

By Chas. D. Moody atty.

N. PETERS, PHOTO-LITHOGRAPHER, WASHINGTON, D. C.

UNITED STATES PATENT OFFICE.

THOMAS L. JONES, OF NATCHEZ, MISSISSIPPI.

IMPROVEMENT IN VALVE-GEARS FOR COMBINED HIGH-PRESSURE AND CONDENSING ENGINES.

Specification forming part of Letters Patent No. 94,891, dated September 14, 1869; Reissue No. 7,805, dated July 24, 1877; application filed October 10, 1874.

DIVISION B.

*To all whom it may concern:*

Be it known that I, THOMAS L. JONES, a resident of Natchez, county of Adams, State of Mississippi, have made a new and useful Improvement in Combined High-Pressure and Condensing Engines, of which the following is a full, clear, and exact description, reference being had to the annexed drawings, making part of this specification, in which—

Figure 1:
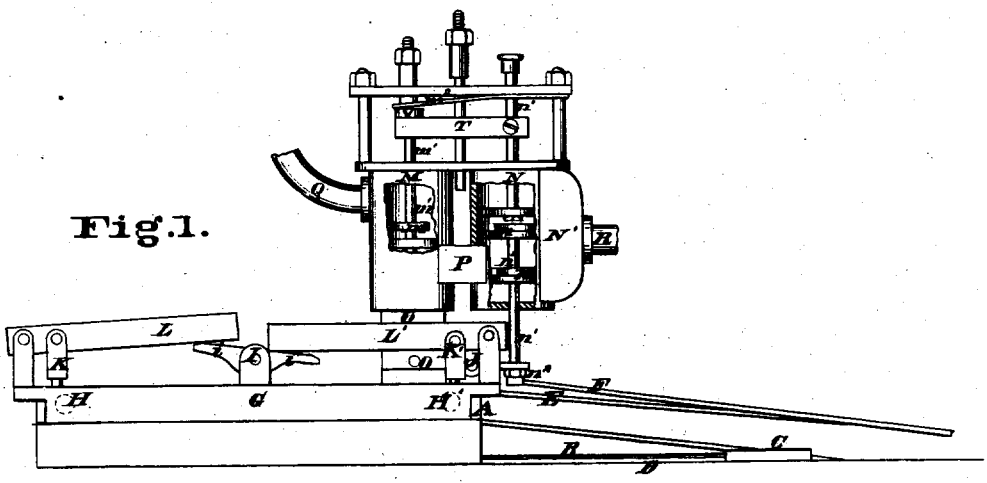
Figure 3:
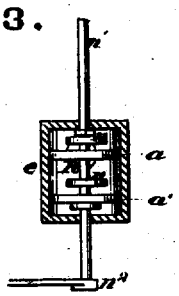
Figure 2:
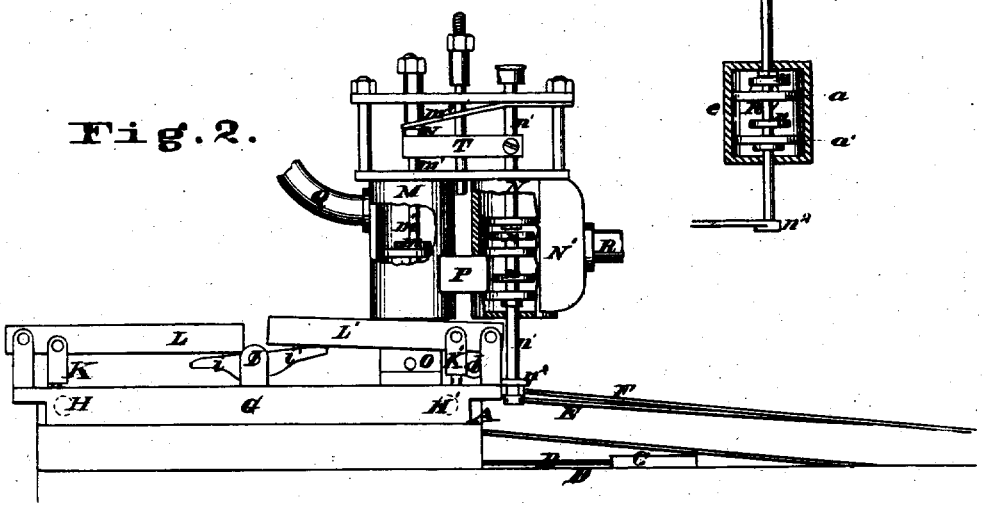

Figures 1 and 2 are side elevations of the invention, portions of the walls being broken away to show the interior of the valve-chests, and the valves being shown in different positions; and Fig. 3, a view, in detail, of what is termed the "condenser-valve."

Like letters indicate like parts.

The present invention is a modification of the invention patented by me April 14, 1868, and numbered 76,776.

A principal object of the improvement is to provide an independent diverting-chamber, wherein the exhaust steam is received, and from which it is suitably directed by means which are independent of the means employed in operating the ordinary engine valve or valves, which admit and liberate the steam to and from the cylinder.

Another aim is to furnish a construction suitable to be used in connection with that form of engine which is commonly employed on steamers on the Mississippi and other Western rivers.

A further object is to provide a construction by means whereof the engine can, at will, be operated either as a high-pressure engine only, or as a combined high-pressure and low-pressure steam-condensing engine.

It also relates to the provision for relieving the engine in the event of accident to the so-called "condenser-valve."

In the accompanying drawing, A represents the cylinder-head of an engine of the class referred to. Such engine is arranged horizontally, or nearly so, and is provided with a steam and with an exhaust side pipe, which extend longitudinally on either side, near the top of the cylinder. The steam is admitted to, and discharged from, the cylinder by puppet-valves suitably operating in the side pipes.

While the present invention operates in connection with the puppet-valves, and with the piston in the cylinder, they are not shown, as their nature and operation are well understood.

B represents the piston-rod; C, the cross-head; D, the slide-bars; E and F, valve-rods, operated by suitable cams on the main shaft, and connected, respectively, with two rock-shafts, I and J, which are arranged transversely to the cylinder.

G represents an exhaust side pipe. The live-steam side pipe is not shown. Affixed to the shaft I is a rocking or lifting lever, *i i'*.

L L' represent two levers, operated alternately by the lifter *i i'*.

K K' represent rods, connecting the levers L L' with valves which open and close pipes H H', respectively, and thus alternately opening a passage for the steam in each end of the cylinder to exhaust into the side pipe G.

H H' represent pipes leading from either end of the cylinder into the side pipe G at each end thereof. They are shown in dotted lines.

O represents a pipe leading from the side pipe G to what I term the "atmospheric" valve-chest M.

N represents another valve-chest, termed the "condenser" valve-chest. These valve-chests are similar, or nearly so, and are arranged vertically and side by side.

P represents a steam-passage, connecting the two chests M and N at a point a little below their center. An escape-pipe, Q, enters the chest M at its side, and at a point a little above its center. Through this pipe steam from the chest M exhausts to the open air.

N' represents a side pipe attached to the side of the chest N. From this side pipe N' a pipe, R, leads to a condenser. Arranged vertically in the chest M is a valve-stem, $m^1$, to which is attached a valve, *m*, which is suitably seated in the chest M at a point above the passage P to the chest N. This construction serves to separate the upper part of the chest M from its lower part, and at a point above the passage P, and below the entrance of the pipe Q.

Similarly arranged in the chest N is a valve-stem, $n^1$, to which is attached a balanced valve, *n n*, the construction whereof is shown more distinctly in Fig. 3.

While the form and arrangement of the valve and stem in the chest N is a desirable one, I do not wish to be limited thereto. Any suitable valve will answer.

As shown, the construction is as follows: The stem $n^1$ is in two parts—an upper and a lower part. To the upper part, by means of a frame, *e*, are attached two annular plates or rings, *a a'*, which work steam-tight in the the chest.

Attached to the lower part of the stem are a pair of circular plates, *n n*, one above the other. These plates form a balanced valve, resting, when closed, upon or against the central openings in the rings *a a'*. The lower end of the lower part of the stem $n^1$ is fastened to a spring, $n^2$. The two parts of the stem are connected only by the sliding parts *e a a'* and plates *n n*.

The upper end of the upper part of the stem, projecting through the top of the chest N, is fastened to a cross-head, T. The valve-stem $m^1$ is also connected with the cross-head, but not rigidly, the stem sliding through it a short distance, the extent of which movement is regulated by an adjustable stop, *v*.

The object of this last-mentioned connection is to enable the steam, when the pressure is above fifteen pounds to the inch, to raise the valve *m* and exhaust to the open air, whatever may be the position of the cross-head and the valves in the condenser-chest. The valve *m*, when the pressure is reduced to atmospheric, falls by its own weight; but, to insure its movement, a spring, $m^2$, is arranged to act upon it. The principal aim of the spring $n^2$ is also to secure the closing of the valve *n n*.

The operation of the invention is as follows: As the steam exhausts from the left-hand end of the cylinder it passes through pipe H into the side pipe G, the toe *i* being lifted so as to open pipe H, and the toe *i'* being depressed so as to close pipe H', as shown in Fig. 1. As the steam exhausts from the right-hand end of the cylinder it also passes into the side pipe G, but through pipe H', lever L' being up and lever L being down, as shown in Fig. 2. From the side pipe G, in either case, the steam passes directly through the pipe O into the valve-chest M, where it forces up the atmospheric valve *m*, and blows off through the pipe Q until an equilibrium with the atmosphere is established. The valve *m* then falls by its own weight, and, simultaneously, the balanced valve *n n* in the chest N opens and establishes a direct communication from the side pipe G to the condenser (not shown) through the parts O, M, P, N, N', and R, and instantly, by the action of the condenser, the remaining fifteen pounds of steam are condensed, and a vacuum is produced in the exhaust end of the cylinder. The live-steam is meanwhile being admitted to the opposite end of the cylinder, so that the piston has a vacuum on one side and a full head of steam on the other side, and, at the same moment, is acting with the combined force of a high-pressure and a low-pressure engine. The valve *n n* is suitably operated by means of a lifter on the rock-shaft J, which, through a suitable rod, connects with the cross-head T.

Should the valves in the condenser-chest fail to act, or the condenser refuse to act, the steam, by reason of the peculiar connection of the valve-stem *m* above described, will blow off without going to the condenser, just as in a simple high-pressure engine. And the invention can be caused to operate as a high-pressure engine exclusively by raising the cross-head and then fastening it, in which position the condenser-valve will be securely seated and the valve *m* open.

In larger engines a suitable sleeve and lever over the shaft are provided for the special purpose of thus raising the cross-head and fastening it.

This arrangement also furnishes a construction by means whereof the engineer can, at will, ascertain the result of employing the condenser-exhaust in connection with the open-air exhaust. By running the engine an equal number of revolutions with and without the former the difference is readily shown.

In Fig. 1 the parts are arranged as when the exhaust is to the open air, the condenser-valve being seated. As it takes but an instant to blow off all the steam above fifteen pounds, the cross-head comes down quickly, allowing the valve *m* to close and opening the valve *n n*. The condenser is then in communication with the cylinder during the remainder of the stroke.

During this stage of the operation the parts are arranged as in Fig. 2. The valve *n n* opens by reason of the rings *a a'*, and the upper part of the stem $n^1$ dropping with the cross-head T.

The relative arrangement of the passage P and the valve *n n* is such, and the connection of the side pipe N' with the chest N is so arranged, as to enable the steam to pass freely to the condenser when the valve *n n* is open. The pipe Q, leading out of the side of the chest M, is preferably arranged so that the valve *m* can rise above it and the steam blow off before the valve reaches the end of its upward throw. The upper end of the valve-chest thus forms an air-chamber, which cushions the valve and prevents any shock.

The throw of the valves *m* and *n n* may be adjusted by changing their positions on their stems, or by adjusting the cross head or the lifting-foot, or moving the cam on the main shaft, which is employed to work the rod F. The working, therefore, of any portion of the apparatus can be easily regulated. This advantage cannot be obtained excepting by an independent diverting-chamber, wherein the exhaust is received, and whose course is directed by mechanism which is independent of that which operates the main valves of the engine.

The construction shown also affords opportunity for the sudden liberation of the steam in either direction, for any desirable size of diverting-chamber can be used, and consequently any desirable size of valve, and the valve-operating mechanism being independent, the valves can be moved at the precise moment needed.

Although the diverting mechanism above described consists chiefly of a pair of valve-chests, provided, respectively, with suitably-operating valves, it will be seen that, by reason of their immediate connection with each other, (the condenser-valve chest really being a continuation of the atmospheric valve-chest,) and their respective valves being operated by a common cross-head, and all having a single and common connection with the exhaust side pipe of the engine, the invention can be regarded, so far as the engine is concerned, as a single construction or diverting chamber, wherein the exhaust steam is received and thence diverted, as in the manner above described.

Having described my invention, what I claim as new therein, and desire to secure by Letters Patent, is—

1. The combination of the cross-head T, valve-stem $m^1$, stop $v$, and valve-stem $n^1$, substantially as described and shown.

2. The combination of the valve-chests M N, valves $m$ and $n$ $n$, stems $m^1$ $n^1$, passage P, pipes Q and R, cross-head T, and side pipe N′, substantially as described.

3. The rod F, rock-shaft J, cross-head T, stems $m^1$ $n^1$, valves $m$ $n$ $n$, and chests M and N, substantially as described and shown.

THOS. L. JONES.

Witnesses:
FRED. PARSONS,
H. Y. CHILD.